United States Patent [19]

Cull

[11] 4,059,418
[45] Nov. 22, 1977

[54] FLUE GAS DESULFURIZATION SORBENT AND PROCESS

[75] Inventor: Neville L. Cull, Baker, La.

[73] Assignee: Exxon Research & Engineering Co., Linden, N.J.

[21] Appl. No.: 559,010

[22] Filed: Mar. 17, 1975

Related U.S. Application Data

[63] Continuation of Ser. No. 390,919, Aug. 23, 1973, abandoned.

[51] Int. Cl.² .............................................. B01D 53/02
[52] U.S. Cl. ........................................... 55/73; 55/74; 423/244
[58] Field of Search ........................... 55/73, 74, 387; 423/244

[56] References Cited

U.S. PATENT DOCUMENTS

| | | | |
|---|---|---|---|
| 3,501,897 | 3/1970 | Van Helmen et al. | 55/74 X |
| 3,755,535 | 8/1973 | Naber | 55/74 X |
| 3,770,647 | 11/1973 | Dautzenberg et al. | 55/73 X |
| 3,776,854 | 12/1973 | Dautzenberg et al. | 55/73 X |
| 3,846,536 | 11/1974 | Cull et al. | 55/73 X |

FOREIGN PATENT DOCUMENTS

667,145  2/1952  United Kingdom

*Primary Examiner*—John Adee
*Attorney, Agent, or Firm*—Wayne Hoover; Jerome E. Luecke

[57] ABSTRACT

Sulfur dioxide is removed from flue gases by contacting the flue gas at elevated temperature with a sorbent comprising a shaped refractory substrate of low surface area and an adherent oxide film impregnated with a transition metal or metal oxide which is selective for the removal of sulfur oxide from gas mixtures on the external surface of the substrate. A technique for laying down the adherent oxide film on the refractory substrate is also disclosed.

14 Claims, No Drawings

FLUE GAS DESULFURIZATION SORBENT AND PROCESS

This application is a continuation of application Ser. No. 390,919, which was filed Aug. 23, 1973, now abandoned.

BACKGROUND OF THE INVENTION

This invention related to processes for removing sulfur oxides from gas mixtures such as flue gas containing the same.

Sulfur dioxide is a constituent of various waste gases. Among these ae flue gases formed by the combustion of fossil fuels, off gases from various chemical and petroleum refining processes, and smelter gas. A major source of sulfur dioxide pollution of the atmosphere is flue gas from electric power plants. Such flue gas typically contains about 0.2-0.3% by volume of sulfur dioxide (more or less, depending on fuel sulfur content), trace amounts of sulfur trioxide, and some oxygen (e.g., about 1-6% by volume) due to the use of excess air in combustion. Sulfur dioxide is irritating to the respiratory system, is toxic to plant life, and is corrosive to metals. Hence, it is imperative that discharge of sulfur dioxide into the atmosphere be held to a low level.

Various processes have been suggested for the removal of sulfur oxides from gases. These may be classified generally into wet and dry processes. The present invention is concerned with the latter. Dry processes generally employ a regenerable solid sorbent comprising an active material for the selective removal of sulfur oxide from gases on a porous support or carrier. The active material generally comprises a metal or metal oxide, such as copper or copper oxide, or a potassium oxide-vanadium pentoxide mixture, and the porous carrier is generally an essentially inert material such as alumina. Dry processes for flue gas desulfurization using solid sorbents are disclosed, for example, in U.S. Pat. Nos. 3,411,865 and 3,501,897, and in British Pat. Nos. 1,089,716 and 1,160,662. Copper oxide on alumina, which is the sorbent composition disclosed in British Pat. No. 1,089,716, is a preferred flue gas desulfurization sorbent. Desulfurization is accomplished by passing flue gas containing sulfur dioxide through a bed of sorbent until the effluent $SO_2$ concentration reaches a predetermined level, then regenerating this sorbent with a reducing gas. For example, when removal of 90% of the sulfur dioxide in the entering gas is desired, desulfurization is stopped and the sorbent is regenerated when the cumulative amount of $SO_2$ in the effluent gas over a whole sorption period reaches 10% of the amount of $SO_2$ in the incoming gas. During desulfurization (or sorption), a part of the active material is sulfated, i.e., converted into a metal sulfate. Thus, for example, copper oxide is partially converted to copper sulphate. This sorption-regeneration cycle can be repeated a large number of times before the sorbent requires replacement.

The active material of the sorbent ordinarily is not completely utilized. That is, when the sulfur dioxide content in the effluent gas reaches the predetermined level, there is still unconverted metal oxide in the sorbent. Furthermore, it has been found that, in general, there is a negative correlation between the strength maintenance of the sorbent and the extent of sulfation of the active material which can be achieved. In other words, the best sulfations are generally obtained with the sorbents which show the greatest loss in crushing strength and hence the greatest susceptibility to attribution with repeated cycling. Another consideration in selecting a suitable flue gas desulfurization sorbent is that effective sulfur oxide removal must be achieved with a low pressure drop, since flue gas in a conventional power plant is ordinarily available at a pressure only slightly above atmospheric.

SUMMARY OF THE INVENTION

According to this invention, sulfur oxides, i.e., sulfur dioxide, and sulfur trioxide when present, are removed from gas mixtures containing the same by contacting the gas mixture at an elevated temperature with a sorbent comprising a shaped low surface area refractory substrate and an outer layer comprising an adherent oxide film on the substrate and a transition metal or metal oxide active material which is selective for the removal of sulfur oxides from gas mixtures.

DESCRIPTION OF THE PREFERRED EMBODIMENT

The sorbents which are used for removing sulfur dioxide (and sulfur trioxide when present) from gas mixtures according to the present invention, comprise three principal components: (1) a shaped refractory substrate having a low surface area, (2) an adherent oxide film on the substrate, and (3) a transition metal or metal oxide active material which is selective for the removal of sulfur oxide from gas mixtures. Materials of this general type are known in the catalyst art, although their use as sorbents for flue gas desulfurization has not been reported; see for example, U.S. Pat. Nos. 2,742,437: 3,228,892: 3,231,520: 3,247,665: and 3,547,832.

The substrate is a shaped refractory material of low surface area. The refractory material is ordinarily a refractory oxide or mixtures of refractory oxides, e.g., alumina, silica, mixtures of silica and alumina (including porcelain and fired clays); mixtures of alumina, silica and magnesia and the like. Alternatively, the substrate can be a high melting point metal, e.g., titanium or stainless steel wire, although in general the metal oxide refractories are preferred. The substrate imparts strength to the sorbent. The substrate materials have a low surface area, typically about 1-3 square meters per gram and seldom over about 10 square meters per gram as measured by nitrogen adsorption (BET method). These materials are preferably of low to medium porosity but may be essentially impervious: the pore volume is typically not over about 0.5 cc/g. The substrate may be in any desired shape, as for example, in the form of particles such as spheres, cylinders, or saddles: or in the form of a shaped article such as a honeycomb or a grid. Substrate materials are ordinarily dense or fairly dense, e.g., having bulk densities of at least about 20 pounds per cubic foot (i.e., at least about 0.3 grams/cc).

The oxide film is a thin adherent film on the external surfaces of the substrate. This film is of an adsorptive material which has a considerably higher surface area per unit weight than that of the substrate. The surface area of the film is ordinarily at least about 75 square meters per gram and more usually at least about 100 square meters per gram. Materials which are known to be useful as catalyst carriers, such as gamma alumina, zirconia, and titania, can be used as the oxide film material according to this invention. A mixture of two or more oxides, e.g., alumina and titania, can also be used as the film material. The film material is a refractory oxide or mixture of oxides and ordinarily a refractory metal oxide or mixtures of oxides. Silica and mixtures of silica with other oxides (e.g., silica-alumina mixtures) are ordinarily not preferred as film materials because flue gas desulfurization sorbents having silica as the carrier material ordinarily do not have good activity.

The thickness of the metal oxide film may range from about 0.001 inch to about 0.01 inch. This film ordinarily constitutes from about 2 to about 15 percent of the total weight of the sorbent.

The sorbent also includes an active material, which is usually comprised of a transition metal or metal oxide, which is capable of selective removal of sulfur oxides (i.e., $SO_2$ and $SO_3$) from gas mixtures. Copper oxide is the preferred active material. However, other active materials which are known in the art, such as manganese oxide, or a mixture of potassium and vanadium oxides, can be used. In general, the active material includes a transition metal oxide and particularly an oxide of a non-noble transition metal from Groups IB, VB, VIB, VIIB of the Periodic Table. (Group and subgroup designations in the Periodic Table are according to the usage of H. G. Deming, "Periodic Table of the Elements" as reproduced for example in Lange, "Handbook of Chemistry", 8th Edition, 1952, pp. 56 and 57.)

The amount of active material is ordinarily in the range of about 4 to about 10% of the weight of metal oxide film, although larger or smaller amounts can be used.

The adherent oxide film can be formed by treatment of the substrate with a metal alkoxide, metal alkyl, or other hydrolyzable organic metal compound corresponding to the desired metal oxide film material, followed by hydrolysis and calcination. Thus, for example, a metal alkoxide such as aluminum isopropoxide, aluminum sec.-butoxide, titanium tetraisobutoxide, zirconium butoxide, etc., or a metal alkyl, such as trimethyl aluminum, triethyl aluminum and tri-isobutyl aluminum, or other hydrolyzable organic compound of aluminum, can be used. The treatment can be carried out one or more times as necessary to build up the desired film thickness. The hydrolyzable compound may be dissolved in a solvent if desired. Lower aliphatic alcohols are desirable solvents for the alkoxides, although paraffins such as hexane, heptane, etc., may also be used. The alkoxides may also be used in the absence of solvents. With the aluminum alkyls an inert solvent such as hexane or heptane can be used, but better results were obtained with the aluminum alkyls in the absence of solvents. Hydrolysis of metal alkoxides in the presence of a substrate is a known method for producing oxide films, as disclosed, for example in British Pat. No. 667,145.

The active material may be incorporated into the sorbent either by coprecipitation of the active material and the oxide film, or by forming the oxide film first and then impregnating the oxide film with a solution of a compound which decomposes into the desired active material. More active sorbents are usually obtained by the latter method. Thus, for example, when a sorbent comprising copper oxide and gamma alumina on substrate is desired, the film of gamma alumina will be formed on the external surface of the substrate, and then the article or particles will be immersed in an aqueous solution of copper nitrate, which is decomposed into copper oxide by calcination. Other metal oxide active materials can be similarly deposited from solutions of the corresponding metal salts.

A substrate having surface roughness is advantageous because roughness promotes good adherence of the oxide film to the substrate. When a smooth surface substrate is used, it may be necessary to use an adhesive or binder in order to obtain adherence of the oxide film to the substrate. Suitable adhesives and binders are known in the art.

A partially prepolymerized metal alkoxide can be used instead of the monomeric metal alkoxide if desired. The partially prepolymerized alkoxide is preferably dissolved in a solvent, such as benzene, heptane, or isopropanol. The use of a partially prepolymerized alkoxide is preferred when a smooth surface substrate is used, in order to obtain an adherent film. Thus, for example, with a smooth surface substrate, it is advisable to use a prepolymerized alkoxide to lay down a thin adherent film of metal oxide, e.g., titania, on calcination. Additional layers of metal oxide, e.g., titania or alumina can then be built up on this initial layer by treatment with alkoxides, hydrolysis and calcination.

The sorbents of this invention can be used to remove sulfur dioxide (and sulfur trioxide when present) from flue gas and other waste gases under known desulfurization conditions. Regeneration can be carried out with a reducing gas under known conditions. Suitable process conditions are described, for example, in British Pat. No. 1,089,716 and in the other references cited earlier. The process of this invention is a cyclic sorption-regeneration process.

During the sorption step of this cycle, flue gas or other waste gas is contacted with the sorbent as described above. The gas is preferably passed through a fixed bed of the sorbent. When a preferred copper oxide-containing sorbent is used, flue gas is passed through the sorbent bed at an inlet temperature of about 600° to about 900° F. and at a space velocity of about 1000 to 10,000 V/V/Hr. All or part of the copper content of the sorbent may be in the form of metallic copper rather than copper oxide at the beginning of the sorption period. Oxygen in the flue gas will oxidize any metallic copper present to copper oxide. Part of the copper oxide then reacts with sulfur dioxide and additional oxygen to form copper sulfate. Initially, substantially all of the sulfur dioxide in the gas is removed. As the desulfurization step proceeds, the concentration of sulfur dioxide in the effluent rises. This usually happens while a part of the copper oxide remains unconverted. Generally, it is desirable to remove at least 90% of the sulfur dioxide content of the gas. To achieve this percentage, the desulfurization is stopped when the cumulative amount of $SO_2$ in the effluent reaches 10% of the total amount of $SO_2$ fed in the flue gas.

Desulfurization temperatures vary slightly from sorbent to sorbent. A potassium oxide-vanadium pentoxide supported sorbent, for example, requires a slightly higher temperature than the preferred copper oxide sorbents.

Regeneration can be accomplished with hydrogen, carbon monoxide, mixtures thereof, or a hydrocarbon which is in the gas or vapor state at the regeneration temperature, which is ordinarily about 600°-900° F. Hydrogen, the most reactive regenerating gas, reduces the copper content of the metallic copper with a substantial amount of copper sulfide formation. Excellent regeneration results can be obtained, with much less copper sulfide formation, by using a gas mixture containing about 5 to 50% by volume of hydrogen and conversely about 50 to about 95% by volume of steam. Regeneration is preferably carried out at approximately the same sorbent bed temperatures as those prevailing during desulfurization. When the sorbent is fully regenerated, it is ready for a new operating cycle.

The sorbents of the present invention have the advantages of high strength, good activity, and good strength and activity maintenance.

This invention will now be described further with reference to the examples which follow.

EXAMPLE 1

A batch of crushed ¼-inch Intalox saddles, weighing 80.74 grams and having a particle size greater than 12 mesh and a BET surface area of 3.0 square meters per gram, was heated overnight at 1000° F. and charged to a glass reactor. (Intalox saddles are predominantly alpha alumina, having a density of about 3.56 grams/cc. Additional properties will be given in Table I below.) The saddles were flooded with aluminum butoxide and heated at 140°–150° F., and allowed to stand for approximately 30 minutes. The excess aluminum sec.-butoxide was decanted off, and the aluminum sec.-butoxide remaining on the saddles was hydrolyzed in air for one hour. The saddles were heated in a vacuum oven (212° F., 26 inches of mercury vacuum) for 1 hour and then calcined at 1000° F. for 1 hour. This treatment was repeated. A thin film of alumina on the substrate was formed. The substrate with the alumina film was again weighed. The gain in weight was 5.96 grams or 7.4%. (The weight gain is taken to be the weight of the alumina film.) The surface area (in square meters per gram) and the pore volume (in cc per gram) of the crushed saddles, before and after treatment, are indicated in Table I below. Also indicated in Table I are the apparent porosity and the water adsorption of the untreated saddles. Water adsorption was taken as the percentage weight gain obtained on immersing the particles in water for 10 minutes, blotting dry, and re-weighing the particles.

TABLE I

|  | Untreated Saddles | Treated Saddles |
|---|---|---|
| Surface area, m²/g. | 3.0 | 28 |
| Pore volume, cc/g. | 0.11 | 0.11 |
| Water adsorption, wt. % | 14.8 | — |

The treated saddles were impregnated with a 25% (by weight) aqueous solution of copper nitrate, Cu(NO₃)₂·3H₂O, air dried for 24 hours, and calcined for 3 hours at 800° F. (Throughout the examples, the term "copper nitrate" will refer to the trihydrate.) A copper analysis on this sorbent by X-ray after testing indicated 1.23 weight percent copper, based on total sorbent.

The sorbent was tested for desulfurization activity in a small laboratory testing unit. This unit was a tubular glass reactor having a length of 18 inches and a diameter of 0.8 inch. A run consisting of several sorption-regeneration cycles was carried out using the sorbent. During the sorption step of each cycle, simulated flue gas consisting of sulfur dioxide (concentrations in Table II below), oxygen (about 1 to 2 percent by volume) and nitrogen was passed through the test unit at an inlet temperature of 650° F. and at a space velocity as indicated in Table II below. By using different SO₂ inlet concentrations and different space velocities in different cycles, the sorbent was tested under three different sets of operating conditions, designated A, B, and C in Table II below. The effluent (or exit) SO₂ concentration was monitored, and in each cycle the time at which the effluent SO₂ concentration reached 300 ppm was determined. When the effluent SO₂ concentration reached 300 ppm. passage of flue gas was stopped and the sorbent was regenerated by passing a gas mixture containing 20% by volume of hydrogen and 80% by volume of steam through the sorbent at an inlet temperature of 650° F. and a space velocity of 5000 V/V/hr. for ten minutes. The average breakthrough time, i.e., the length of time in minutes to reach an effluent SO₂ concentration of 300 ppm, and the percentage sulfation (or utilization) of the copper oxide active material at breakthrough for each cycle, were determined. Each breakthrough time and percentage sulfation in Table II represents the average of two cycles; the values in column A, for example, represent the second and third cycles. The results for the first cycle are not reported because first cycle data on a fresh sorbent usually show a longer breakthrough time and a higher percentage sulfation than subsequent cycles.

TABLE II

| (1.23 wt. % Cu based on total sorbent) | A | B | C |
|---|---|---|---|
| Cycles | 2–3 | 4–5 | 6–7 |
| Space Velocity, V/V/hr. | 3000 | 6000 | 6000 |
| SO₂ in feed, ppm | 2000 | 1000 | 2000 |
| Time to 300 ppm exit SO₂, minutes | 24 | 13 | 6 |
| % Sulfation | 58 | 31 | 24 |

This sorbent showed very good copper utilization (i.e., percentage sulfation).

EXAMPLE 2

Three batches of sorbent having a substrate of crushed ¼-inch Intalox saddles and a film of high surface area alumina impregnated with copper oxide, were prepared according to the procedure of Example 1, except for differences in the weights of saddles and alumina film, and the weight percentage of copper on total sorbent. These sorbents are designated 2A, 2B, and 2C.

Each of the three sorbents was tested for desulfurization activity using the reactor described in Example 1. For each sorbent a run consisting of several sorption-regeneration cycles was carried out. During the sorption step of each cycle, simulated flue gas containing 2000 ppm of SO₂, a small amount of oxygen, balance nitrogen was was passed through the reactor at an inlet temperature of 650° F. and a space velocity of 3000 V/V/hr. When the effluent SO₂ concentration reached 300 ppm, passage of flue gas was stopped and the sorbent was regenerated in the manner described in Example 1. The breakthrough time, i.e., the length of time to reach an effluent SO₂ concentration of 300 ppm, and the percentage sulfation of copper oxide active material at that time, were determined for each cycle. Results for all cycles except the first were averaged and are reported in Table III below.

TABLE III

|  | Sorbent | | |
|---|---|---|---|
|  | 2A | 2B | 2C |
| Weight of saddles, g. | 31.6 | 31.1 | 31.7 |
| Wt. % film (on substrate) | 5.1 | 6.1 | 4.6 |
| Wt. % Cu (on total sorbent) | 1.4 | 1.5 | 2.16 |
| Time to 300 ppm exit SO₂, minutes | 17 | 14 | 12 |

TABLE III-continued

| | Sorbent | | |
|---|---|---|---|
| | 2A | 2B | 2C |
| % Sulfation at 300 ppm SO₂ | 105 | 91 | 57 |

The sulfation values are based on copper analysis; hence a slightly low copper analysis can give a high sulfation. This is regarded as the most likely reason for the better than 100% sulfation value in Run 2A.

EXAMPLE 3

A batch of crushed Intalox saddles, larger than 12 mesh and weighing 60.24 grams, was charged to a tubular glass reactor 12 inches long and 1 inch in diameter. The reactor was flooded with a solution containing 8.5% by weight of copper octoate in aluminum sec.-butoxide at 140°–150° F. The solution was allowed to stand in the reactor for about 90 minutes, and was then drained off. The drained saddles were allowed to hydrolyze by blowing nitrogen saturated with water vapor into the reactor. The saddles were dried in a vacuum oven (26 inches of mercury vacuum, 200° F.), and the above steps were repeated. In this manner a film consisting of coprecipitated copper oxide and alumina was formed on the surface of the saddles. The coated saddles were calcined for 3 hours at 1000° F. The total weight gain was 11.1%, and weight percent of Cu on sorbent was 0.63%.

The sorbent was tested for desulfurization activity using the laboratory testing unit and the test procedure described in Example 1. Two results (average of all cycles except the first) are given in Table IV below.

TABLE IV

| Sorbent: | |
|---|---|
| Wt. of substrate, g. | 60.24 |
| Wt. % alumina film (on substrate) | 11.1 |
| Wt. % Cu (on total sorbent) | 0.63 |
| Testing: | |
| Flue gas space velocity, V/V/hr. | 3000 |
| Flue gas SO₂ content, ppm | 2000 |
| Time to 300 ppm exit SO₂, minutes | 11 |
| % Sulfation at 300 ppm exit SO₂ | 207 |

The value of 0.63% Cu appears to be low accounting for the high sulfation: however, the breakthrough time obtained is indicative of good activity.

EXAMPLE 4

A batch of ¼-inch Intalox saddles (density about 3.56 g/cc.; BET surface area approximately 1–2 square meters per gram; apparent porosity 39%; water adsorption 14–15%) weighing 53.63 grams was calcined overnight at 1000° F. and charged to a metal reactor. This reactor was constructed of Schedule 80 carbon and steel pipe, approximately six inches long and 1 ½ inches in diameter, with an observation port located about 2 ½ inches from the bottom. The bottom consisted of a welded Schedule 80 carbon steel cap with a thermocouple well extending up into the reactor for a length of 2 inches and an opening for 174 inch tubing. The tubing was connected to a cylinder of aluminum alkyl at one end and the other end ran through the opening into the bottom of the reactor. The reactor top consisted of a "Kam-Lok" quick disconnect head and adapter. Provision was made for flushing the reactor and all lines with solvent (heptane) and/or nitrogen. The calcined saddles were charged to the reactor by opening the head. After charging, the entire system was flushed thoroughly with dry nitrogen. The reactor and its contents were flooded with 100% triethyl aluminum until a liquid level was noted in the observation port. The liquid was allowed to stand for approximately 30 minutes and was then drained off into an evacuated (lecture bottle) bomb. All lines were flushed with heptane up to the bottom of the reactor, the heptane was drained, and then all lines were flushed with nitrogen. Nitrogen gas was passed through a water bubbler at room temperature, and the moist nitrogen was then flowed into the reactor for a period of approximately 16 hours. A very slight temperature rise was noted. To insure complete hydrolysis, 2 cc. of water were added through the top and the saddles were allowed to stand in the reactor over a weekend. The saddles were then discharged and heated for four hours at 1000° F.; the weight gain was 5.5%. The coated saddles were again treated as described above. The total weight gain after the second treatment and calcination was 7.2%, based on the weight of untreated saddles.

A 50.0-gram batch of the coated saddles was impregnated by immersing the saddles in a 22% (by weight) aqueous solution of copper nitrate for 10 minutes, draining off the impregnating solution, blotting off the excess solution, and air drying the saddles for 24 hours. The saddles were then calcined for three hours at 800° F. Copper analysis showed 0.65% by weight Cu, based on total sorbent weight. This sorbent was designateed 4A.

A control sorbent 4B was made by impregnating a batch of uncoated saddles with copper nitrate, drying and calcining in the same manner as the coated saddles. This sorbent contained 0.85 wt. % Cu, based on total sorbent weight.

Sorbents 4A and 4B were tested for desulfurization activity in the laboratory testing unit described in Example 1. A run consisting of several sorption-regeneration cycles was carried out. The SO₂ inlet concentration and space velocity are as noted in Table V below; otherwise, the test conditions during both sorption and regeneration are the same as in Example 1.

Results are shown in Table V below:

TABLE V

| | Sorbent | |
|---|---|---|
| | 4A | 4B |
| Alumina coating | Yes | No |
| Wt. % Cu | 0.65 | 0.85 |
| Inlet SO₂ ppm | 2800 | 2800 |
| Space velocity, V/V/hr. | 693 | 693 |
| Time to 300 ppm effluent SO₂, min. | 32 | <2 |
| % Sulfation | 112 | — |

The percentage sulfation value of 112% for Sorbent 4A was based on copper analysis. The value could be greater than 100% either because of a low copper analysis or because of sulfation of part of the alumina.

EXAMPLE 5

A batch of ½-inch Alundum (alpha alumina) spheres weighing 123.8 grams was heated for three hours at about 800° F., cooled, and then immersed in liquid aluminum sec.-butoxide for 30 minutes. The aluminum sec.-butoxide was decanted off, and the small amount which remained on the spheres was hydrolyzed in air overnight. The spheres were then calcined for three hours at 800° F. This procedure was repeated for a total of 3 times. The final calcination was carried out at 1200° F. This produced a thin coating or film of high surface area alumina. The total gain in weight was 21.07 grams, or 17%. Samples of the coated and uncoated spheres were submitted for surface area and pore volume determinations by the BET method, and for water sorption determination.

Batches of the alumina-coated (prepared as described above) and uncoated spheres were then impregnated by immersion in an aqueous solution of copper nitrate, draining, air drying overnight and calcining for three hours at 800° F. The nominal or target amount of copper in each case was 1.5% of total sorbent weight. A copper content of 1.7% by weight (based on total sorbent weight) was achieved in the case of the coated spheres: the uncoated spheres, on the other hand, were found to contain only 0.7% by weight of copper. The sorbent obtained from the coated spheres is designated 5A; the sorbent obtained from the uncoated spheres is designated 5B.

The above sorbents were tested for flue gas desulfurization activity, using the tubular laboratory reactor described in Example 1. The test procedure of Example 1 was used except that the simulated flue gas contained 2700 ppm of sulfur dioxide, and the flue gas space velocity in all cycles was 3000 V/V/hr. In the run using the uncoated spheres 5B (i.e., the spheres in which copper oxide was impregnated directly onto the substrate), immediate breakthrough of $SO_2$ into the effluent (i.e., $SO_2$ effluent concentration greater than 300 ppm) occurred: in other words, virtually no $SO_2$ was removed. In the run using the coated spheres 5A, the sorption period times (or breakthrough times) at which the effluent $SO_2$ concentration was 300 ppm and at which the cumulative total effluent $SO_2$ was 10% of the cumulative total entering $SO_2$ (i.e., 90% $SO_2$ removal), and the percentage sulfation (or copper utilization) at each of those times, are indicated in Table VI below. Also indicated in Table VI are the surface areas, pore volume, and water sorption data of the coated and the uncoated spheres prior to copper impregnation.

TABLE VI

|  | Sorbent 5A | 5B |
|---|---|---|
| Coated with alumina | Yes | No |
| Surface area, $m^2/g$. | 30 | <1 |
| Pore volume, cc/g. | 0.13 | — |
| Water sorption, wt. % | 16 | 9 |
| Wt. % Cu | 1.7 | 0.7 |
| At 300 ppm exit $SO_2$: | | |
| Time, min. | 6 | 0 |
| % Sulfation | 16 | 0 |
| At 90% $SO_2$ removal: | | |
| Time, min. | 10 | 0 |
| % Sulfation | 22 | 0 |

EXAMPLE 6

Four cylinders of uncoated "AlSiMag 795" honeycomb, length 1 inch, diameter 1 inch, wall thickness 0.01 inch, eight corrugations per inch, were calcined overnight at 1000° F. ("AlSiMag 795" is a hard, dense alumina-silica magnesia composite having a bulk density of about .66 g/cc. and a BET surface area of about 1-2 $m^2/g$. and is made by American Lava Corporation, a subsidiary of Minnesota Mining and Manufacturing Company, St. Paul, Minnesota). These four cylinders had a total weight of 33.89 g. The cylinders were immersed in liquid aluminum sec.-butoxide for 30 minutes at 60° C., drained while hot, allowed to stand in air overnight to hydrolyze the aluminum sec.-butoxide remaining on the cylinders, and then calcined for 3 hours at 1000° F. The cylinders were then given a second alkoxide treatment, in which the cylinders were immersed in a 70/30 (by weight) mixture of aluminum sec.-butoxide and hexane for 30 minutes at 60° C., the excess liquid decanted, the aluminum sec.-butoxide remaining on the saddles hydrolyzed over a weekend, and the coated honeycomb heated slowly at 1000° F. and then calcined for 3 hours at 1400° F. The gain in weight after calcination was 5.69 grams, corresponding to a 17.8% weight gain. The coated honeycombs were impregnated by immersion in a 20% aqueous solution of copper nitrate and allowing to stand for five minutes. The cylinders were then shaken and blotted to remove excess impregnating solution. The nominal copper content was 1.5% by weight, and the actual analyzed copper content was 1.3% by weight. The honeycombs were air dried overnight and then calcined for three hours at 800° F. The impregnated honeycombs were green in color.

The impregnated honeycombs (Sorbent 6A) were charged to a tubular laboratory reactor 18 inches long and 1.25 inches in diameter, and were tested for flue gas desulfurization activity in a run consisting of several sorption-regeneration cycles. During each sorption period, synthetic flue gas containing 2700 ppm by volume of $SO_2$, 2% by volume of oxygen, balance nitrogen, was passed through the reactor containing the sorbent bed at a space velocity of 3600 V/V/hr. The run included 3 cycles in which the flue gas inlet temperature was 650° F., followed by 3 cycles in which the inlet temperature was 750° F. When the cumulative amount of $SO_2$ in the effluent reached 10% of the cumulative amount of $SO_2$ fed (90% $SO_2$ removal), flue gas flow was stopped and the sorbent was regenerated by passing the gas mixture containing 20% by volume hydrogen and 80% by volume of steam through the sorbent bed at the same temperature used in the sorption period (650° or 750° F.), and a space velocity of 5000 V/V/hr. for 10 minutes.

For the sake of comparison, three copper oxide on high surface area alumina sorbents, two in the shape of rings and one in the shape of saddles, were also evaluated for flue gas desulfurization activity, using the same reactor. These three sorbents were designated 6B, 6C, and 6D. The test procedure for testing these three sorbents was the same as that used for testing Sorbent 6A except that the flue gas space velocity was 3000 V/V/hr. and the flue gas inlet temperature was 650° F. in all cycles, regeneration was at an inlet temperature of 650° F, using an 80/20 steam-hydrogen mixture of 5000 V/V/hr., for a period of 10 minutes.

Flue gas space velocities, flue gas inlet temperatures, breakthrough times at 90% $SO_2$ removal (i.e., the time at which the cumulative total of $SO_2$ in the effluent flue gas is 10% of the total amount of $SO_2$ in the entering gas), and the percentage copper utilization (i.e., 90% is sulfation) at 90% $SO_2$ removal, were determined for each cycle in each run. Results for each cycle except the first for each run were averaged. In the tests on Sorbent 6A, results for cycles having a flue gas inlet temperature of 650° F. and those having an inlet temperature of 750° F. were averaged separately, and results for the first cycle of the run were not included in the average. Results are indicated in Table VII below.

TABLE VII

| Sorbent | 6A | | 6B | 6C | 6D |
|---|---|---|---|---|---|
| Shape | Honeycomb | | Rings | Rings | Saddles |
| Wt. % Cu | 1.3 | | 3.4 | 4.3 | 4.2 |
| Inlet Temp., ° F. | 650 | 750 | 650 | 650 | 650 |
| V/V/hr. | 3600 | | 3000 | 3000 | 3000 |

TABLE VII-continued

| Sorbent | 6A | 6B | 6C | 6D |
|---|---|---|---|---|
| 90% SO$_2$ removal: | | | | |
| Time, min. | 9 | 14 | 7.3 | 5.7 | 2.4 |
| %Sulfation | 32 | 48 | 15.7 | 9.1 | 4.1 |

EXAMPLE 7

A crinkled wire mesh (type 304 stainless steel, diameter 0.001 inch) weighing approximately 12 grams was packed into a quartz tube (length 12 inches, inside diameter .5 inch) to a density of about 0.44 gram/cc. The wire mesh was coated with an alumina film, 0.002 inch thick, deposited from a sodium aluminate solution according to the following procedure: A solution of sodium aluminate was prepared by heating overnight at 150°–180° F., 500 ml of water, with 35 g NaOH and 20 grams of aluminum metal chips. The quartz tube containing the crinkled wire mesh was immersed in the sodium aluminate solution, additional aluminum added and heated at 150°–180° F. After the alumina was deposited, the quartz tube was removed, washed with water and calcined 3 hours at 1000° F. (This procedure is a modification of the procedure described in Example 1 of U.S. Pat. No. 3,231,520.) After the coating was formed, the coated sorbent was washed, dried and calcined at 1000° F. The alumina coating had about a weight of 3.5 grams, a surface area of 236 m$^2$/g. and a pore volume of 0.30 cc/g. The coated sorbent was impregnated with aqueous copper nitrate, dried and calcined: the weight percentage of Cu on total support was found to be approximately 4%.

The sorbent was tested for flue gas desulfurization activity using the type tube described above in this example as the reactor. Different inlet SO$_2$ concentrations, inlet temperatures, and flue gas space velocities were used in different cycles to give three different sets of conditions (designated A, B, and C in Table VIII below); otherwise the test procedure was the same as in Example 1.

TABLE VIII

| | A | B | C |
|---|---|---|---|
| Flue gas: | | | |
| Inlet SO$_2$, ppm | 1000 | 2000 | 2000 |
| Inlet Temp., ° F. | 650 | 650 | 760 |
| Space Velocity, v/v/hr. | 3000 | 6550 | 6550 |
| At 300 ppm exit SO$_2$: | | | |
| Time, min. | 44 | 9 | 19 |
| % Sulfation | 26 | 24 | 50 |

Comparison of Set A with Set B shows that only a negligible drop in sulfation occurred as a result of doubling the flue gas space velocity and concentration. This is unexpected since a doubling of space velocity usually results in a substantial drop in sulfation. Comparison of Sets B and C shows an increase in sorbent activity with increasing temperature, which is usual.

EXAMPLE 8

A batch of crushed ¼-inch Intalox saddles having a surface area of about one square meter per gram and weighing 51.92 grams, was immersed in a solution comprising 23.4 grams of partially polymerized titanium butoxide ("Ty20R" PB, made and sold by E. I. duPont de Nemours & Co., Wilmington, Delaware, USA), 80.0 grams of aluminum sec.-butoxide, and 15 grams of heptane. After decanting off the solution, the saddles and the solution adhering thereto were hydrolyzed with wet nitrogen at room temperature (for 16 hours), dried in a vacuum oven for one hour (at 90°–100° C. and 24–26 inches Hg. vacuum) and then calcined for 1 hour at 1000° F. The gain in weight after drying was 2.28 grams, or 5.5%. The treatment was repeated except that a 2 hour calcination period was used. The overall gain in weight was 5.91 grams, or 11.4%. The coated saddles were impregnated with an aqueous solution of copper nitrate (6.6% Cu), air dried for 24 hours, and calcined for 3 hours at 800° F., which caused the copper nitrate to be converted to copper oxide. The copper content based on total sorbent weight was 1.06% by weight. The above sorbent was tested for flue gas desulfurization activity in a tubular laboratory reactor, one inch in diameter, and 18 inches long. Synthetic flue gas containing 2000 ppm of SO. 2% by volume of oxygen, balance nitrogen was passed through the reactor at an inlet temperature of 650° F. and a space velocity of 3000 V/V/hr. until the concentration of SO$_2$ in the exit gas reached 300 ppm. Then the sorbent was regenerated by passing a mixture of 20% by volume of hydrogen and 80% by volume of steam through the reactor at an inlet temperature of 650° F. and a space velocity of 5000 V/V/hr. for 10 minutes. Several additional sorption-regeneration cycles were carried out in this manner. The average breakthrough time (time to reach 300 ppm exit SO$_2$ concentration) was 18 minutes, and the average percentage sulfation of copper oxide during sorption was 49.7%. Results for the first cycle are excluded from the average.

A portion of the coating solution described above was allowed to hydrolyze in air for 24 hours at room temperature, air dried and then calcined for 3 hours at 1000° F. The surface area (BET) was found to be 342m$^2$/g. and the pore volume 0.38 cc/g. These values should be similar to those of the coating deposited on the saddles which were activity tested.

What is claimed is:

1. In a process wherein sulfur dioxide is separated from a gaseous mixture containing the same by contacting said gaseous mixture, under desulfurization conditions, with a solid sorbent comprising a carrier and an active material supported thereon, which active material will selectively react with sulfur dioxide at the desulfurization conditions employed, the improvement wherein said carrier comprises a low surface area substrate coated with an adherent refractory oxide film.

2. The improvement of claim 1 wherein said substrate is a ceramic material.

3. The improvement of claim 2 wherein said substrate has a surface area not over about 10 square meters per gram.

4. The improvement of claim 2 wherein said substrate has a pore volume not over about 0.5 cc/g.

5. The improvement of claim 2 wherein said substrate comprises alumina.

6. The improvement of claim 1 wherein said film is alumina.

7. The improvement of claim 1 wherein said film is a mixture of alumina and titania.

8. The improvement of claim 1 wherein said active material is copper oxide.

9. The improvement of claim 1 wherein said active material is deposited on said film.

10. The improvement of claim 1 wherein said oxide film is formed by treatment of the substrate with a hydrolyzable organic metal compound corresponding to the desired oxide film material, followed by hydrolysis and calcination.

11. The improvement of claim 6 wherein the alumina film is formed by treatment of the substrate with a hydrolyzable organic aluminum compound followed by hydrolysis and calcination.

12. The improvement of claim 4 wherein the organic aluminum compound is an aluminum alkoxide.

13. The improvement of claim 11 wherein the organic aluminum compound is an aluminum alkyl.

14. The improvement of claim 1 wherein the film comprises titania and alumina and is formed by treating the substrate with a partially prepolymerized titanium alkoxide and with an aluminum alkoxide, followed by hydrolysis and calcination.

* * * * *